United States Patent
Mahbub et al.

(10) Patent No.: US 11,710,344 B2
(45) Date of Patent: Jul. 25, 2023

(54) COMPACT ENCODED HEAT MAPS FOR KEYPOINT DETECTION NETWORKS

(71) Applicant: QUALCOMM Incorporated, San Diego, CA (US)

(72) Inventors: Upal Mahbub, San Diego, CA (US); Rakesh Nattoji Rajaram, San Diego, CA (US); Vasudev Bhaskaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 16/859,836

(22) Filed: Apr. 27, 2020

(65) Prior Publication Data

US 2021/0334516 A1 Oct. 28, 2021

(51) Int. Cl.
| | |
|---|---|
| *G06N 3/08* | (2023.01) |
| *G06V 10/75* | (2022.01) |
| *G06V 40/16* | (2022.01) |
| *G06V 10/764* | (2022.01) |
| *G06V 10/82* | (2022.01) |
| *G06V 10/44* | (2022.01) |
| *G06V 10/28* | (2022.01) |

(52) U.S. Cl.
CPC .......... *G06V 40/168* (2022.01); *G06N 3/08* (2013.01); *G06V 10/28* (2022.01); *G06V 10/454* (2022.01); *G06V 10/764* (2022.01); *G06V 10/82* (2022.01)

(58) Field of Classification Search
CPC ........... G06K 9/00268; G06K 9/00275; G06K 9/00281; G06K 9/00228; G06K 9/00234; G06K 9/00241; G06K 9/6202; G06K 9/62; G06K 9/6201; G06K 9/6204; G06V 10/82; G06V 10/454

USPC ........ 382/115–118, 100, 155–159, 173, 171, 382/217, 224
See application file for complete search history.

(56) References Cited

U.S. PATENT DOCUMENTS

| | | | |
|---|---|---|---|
| 2014/0044359 A1* | 2/2014 | Rousson | G06K 9/4604 382/197 |
| 2014/0355821 A1* | 12/2014 | Solem | G06K 9/00281 382/103 |
| 2016/0042223 A1* | 2/2016 | Suh | G06K 9/6296 348/156 |

(Continued)

OTHER PUBLICATIONS

Lee JH, Yu HJ, Kim MJ, Kim JW, Choi J. Automated cephalometric landmark detection with confidence regions using Bayesian convolutional neural networks. BMC Oral Health. 2020;20(1):270. Published Oct. 7, 2020. doi:10.1186/s12903-020-01256-7 (Year: 2020).*

(Continued)

*Primary Examiner* — Sean M Conner
*Assistant Examiner* — Stephen M Brinich
(74) *Attorney, Agent, or Firm* — QUALCOMM Incorporated

(57) ABSTRACT

A method is presented. The method includes determining a number of landmarks in an image comprising multiple pixels. The method also includes determining a number of channels for the image based on a function of the number of landmarks. The method further includes determining, for each one of the number of channels, a confidence of each pixel of the multiple pixels corresponding to a landmark. The method still further includes identifying the landmark in the image based on the confidence.

14 Claims, 8 Drawing Sheets

(56) References Cited

U.S. PATENT DOCUMENTS

2017/0076142 A1* 3/2017 Chang ............... G06K 9/00281
2021/0110594 A1* 4/2021 Teixeira ............... A61B 5/0035

OTHER PUBLICATIONS

J. P. Robinson, Y. Li, N. Zhang, Y. Fu and S. Tulyakov, "Laplace Landmark Localization," 2019 IEEE/CVF International Conference on Computer Vision (ICCV), 2019, pp. 10102-10111, doi: 10.1109/ICCV.2019.01020. (Year: 2019).*

D. Prasser and G. Wyeth, "Probabilistic visual recognition of artificial landmarks for simultaneous localization and mapping," 2003 IEEE International Conference on Robotics and Automation (Cat. No. 03CH37422), Taipei, Taiwan, 2003, pp. 1291-1296 vol. 1, doi: 10.1109/ROBOT.2003.1241770. (Year: 2003).*

\* cited by examiner

COMPACT ENCODED HEAT MAPS FOR KEYPOINT DETECTION NETWORKS

BACKGROUND

Field

Aspects of the present disclosure generally relate to keypoint detection neural networks.

Background

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field.

Convolutional neural networks are used in various technologies, such as autonomous driving, Internet-of-Things (IoT) devices, and facial landmark detection. Facial landmark detection is a preprocessing step for a variety of applications, such as bokeh, animoji, face beautification, face swap, and face-based authentication. It is desirable to improve facial landmark detection while reducing a network's size and memory use.

SUMMARY

According to an aspect of the present disclosure, a method includes determining a number of landmarks in an image comprising multiple pixels. A method also includes determining a number of channels for the image based on a function of the number of landmarks. A method also includes determining, for each of the number of channels, a confidence of each pixel of the multiple pixels corresponding to a landmark. A method further includes identifying the landmark in the image based on the confidence.

In another aspect of the present disclosure, an apparatus includes a memory and at least one processor operatively coupled to the memory. The memory and the processor(s) determines a number of landmarks in an image comprising multiple pixels. The memory and the processor(s) also determines a number of channels for the image based on a function of the number of landmarks. The memory and the processor(s) further determines, for each of the number of channels, a confidence of each pixel of the multiple pixels corresponding to a landmark. The memory and the processor(s) also identifies the landmark in the image based on the confidence.

In another aspect of the present disclosure, an apparatus includes means for determining a number of landmarks in an image comprising multiple pixels. The apparatus also includes means for determining a number of channels for the image based on a function of the number of landmarks. The apparatus further includes means for determining, for each of the number of channels, a confidence of each pixel of the multiple pixels corresponding to a landmark. The apparatus also includes means for identifying the landmark in the image based on the confidence.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
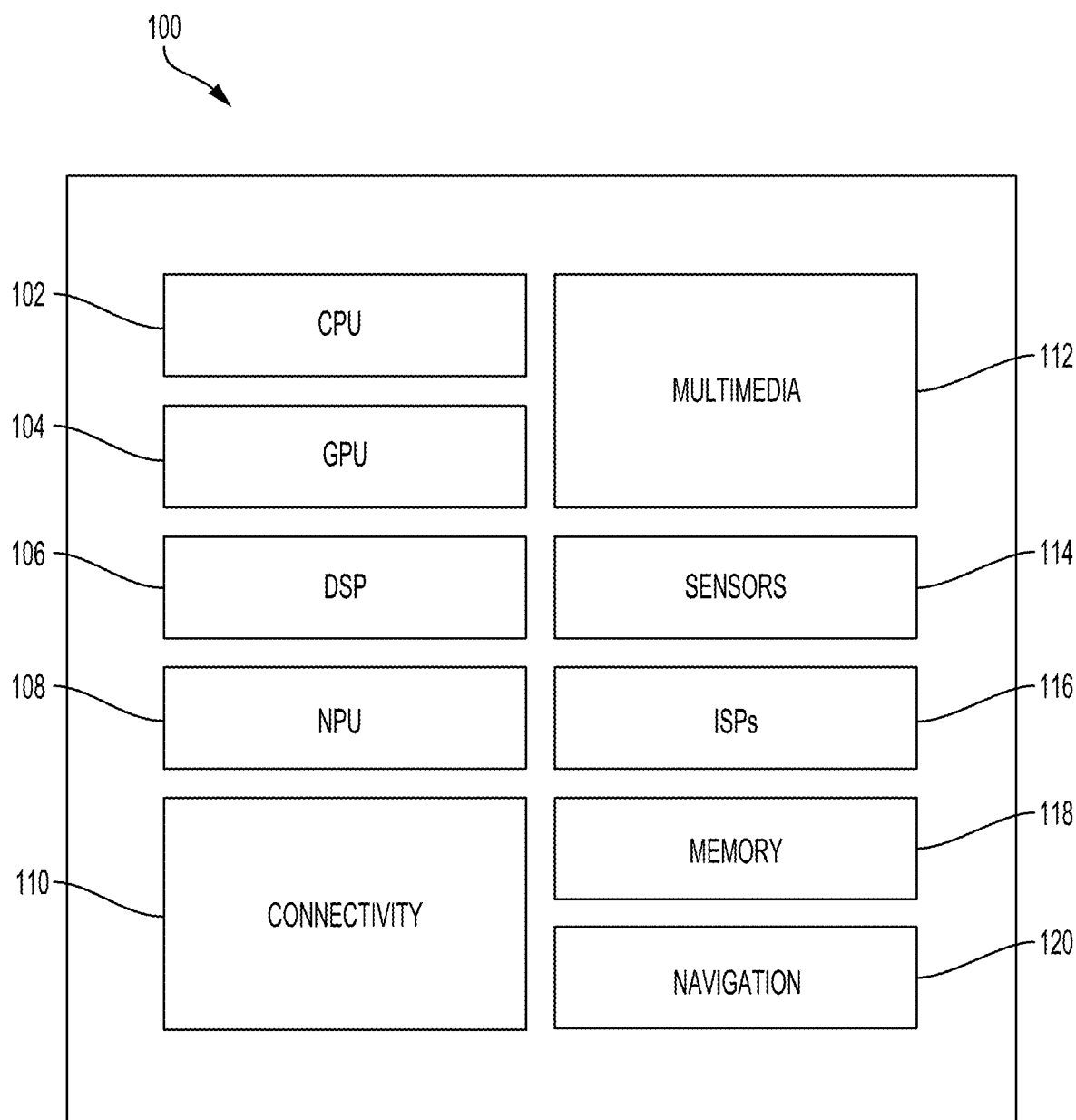
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Facial landmark detection is a pre-processing step used in a variety of applications, such as bokeh, animoji, face beautification, face swap, and face-based authentication. Conventional systems generate location heat maps for each landmark using a neural network, such as an hourglass network. A location of a landmark may be inferred from the heat map. In these conventional systems, the number of heat map channels usually equals to the number of landmarks to be estimated. As such, memory and processor use may increase as the number of required landmarks increases. It is desirable to reduce an amount of resources (e.g., memory and computational load) used for landmark detection.

Aspects of the present disclosure are directed to an encoding-based approach to detect multiple landmarks from a heat map. The encoding-based approach reduces the amount of resources used when detecting and/or tracking landmarks. Aspects of the present disclosure are not limited to facial landmarks and may be used for other keypoint detection tasks, such as joint detection.

FIG. 1 illustrates an example implementation of a system-on-a-chip (SOC) 100, which may include a central processing unit (CPU) 102 or a multi-core CPU configured for detecting multiple landmarks from a heat map using an encoding-based approach, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to determine a number of landmarks in an image including multiple pixels. The general-purpose processor 102 may also comprise code to determine a number of channels for the image based on a function of the number of landmarks. The general-purpose processor 102 may further comprise code to determine, for each one of the number of channels, a confidence of each pixel of the multiple pixels corresponding to a landmark. The general-purpose processor 102 may still further comprise code to identify the landmark in the image based on the confidence.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
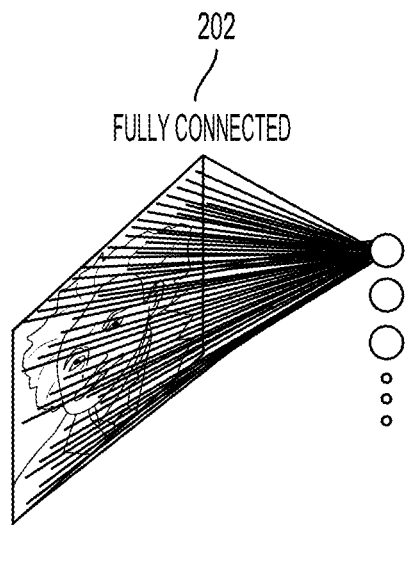
FIGS. 2A, 2B, and 2C are diagrams illustrating a neural network in accordance with aspects of the present disclosure.
Figure 2B:
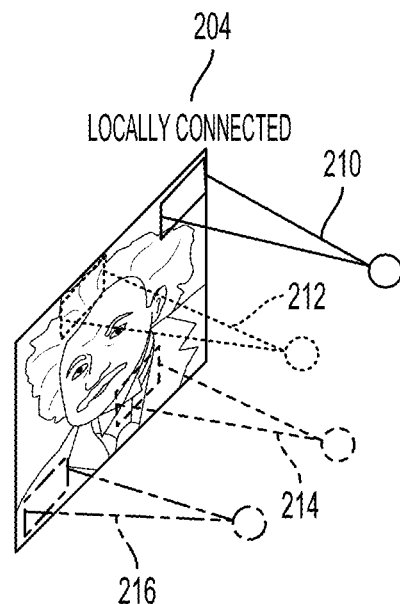

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
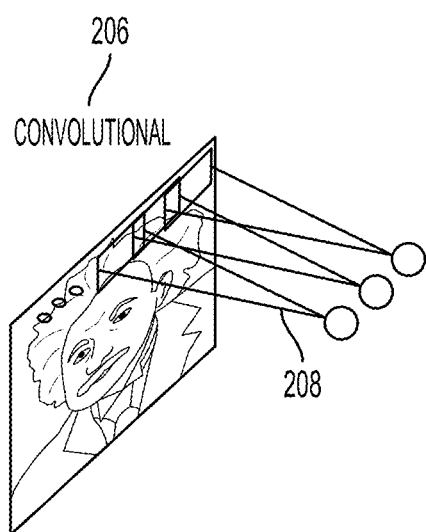

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
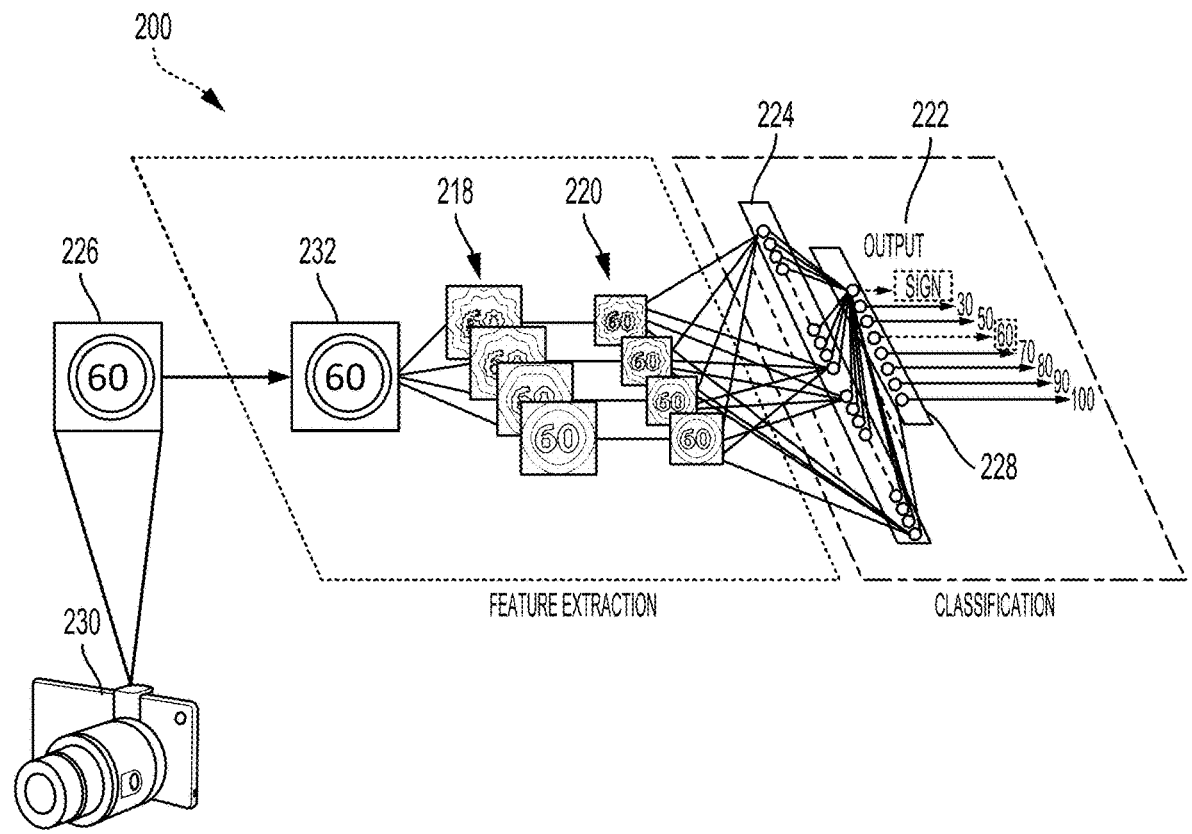
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
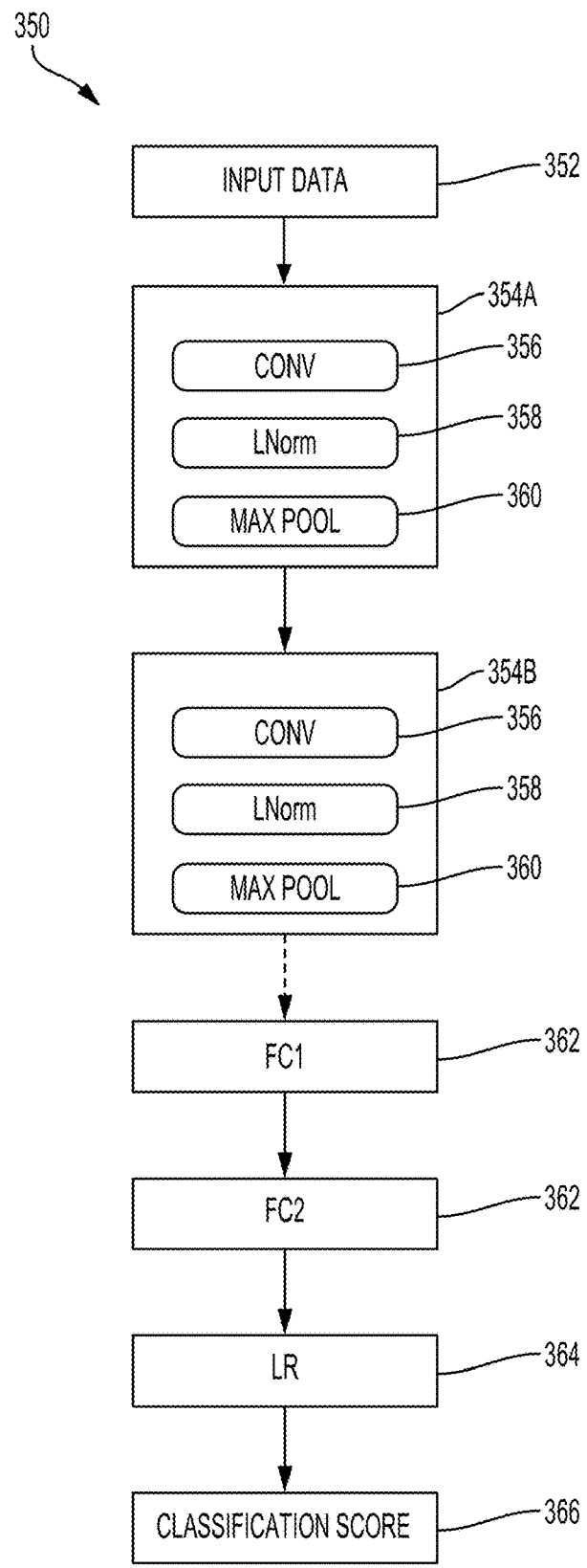
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

Facial landmark detection may be used in various applications, such as emotion detection, gaze detection, image augmentation, and virtual imaging. The process of facial landmark detection includes detecting a face and points of interest in the face. The points of interest may be referred to as landmarks.

A landmark detection neural network (e.g., hourglass network) may be used for facial landmark detection. Conventional landmark detection networks generate separate heat maps for each of the M landmarks. In contrast, aspects of the present disclosure assign each landmark pixel of a set of landmark pixels a unique ID value between 0 and (M−1), where M is the number of landmarks. The ID values are converted into a $\lceil \log_2(M) \rceil$-bit binary value. A separate output channel may be generated for each bit.

In one configuration, background pixels (e.g., non-landmark pixels) are denoted by zero, and each landmark location is assigned a unit variance Gaussian distribution of magnitude negative one or one. The unit variance Gaussian distribution may be based on a bit value of a pixel, where the bit value is zero or one. Aspects of the present disclosure use $K = \lceil \log_2(M) \rceil$ gaussian-masked channels denoted as $G^k$ (where, k=1, 2, . . . , K), for representing the landmark locations. The network estimates the Gaussian-masked channels by reducing a distance-based error with a ground truth mask.

The $K = \lceil \log_2(M) \rceil$ Gaussian-masked channels reduce an output size in comparison to conventional networks that use M channels for each of the M landmarks. The reduction of the output size reduces resource use, such as processor and/or memory use. For example, for a 128×128 image having M=256 landmarks, conventional systems would have an output size of 256×128×128 (e.g., 256 output channels). In contrast, for a 128×128 image having M=256 landmarks, the output size according to aspects of the present disclosure is 8×128×128 (e.g., eight output channels ($8 = \lceil \log_2(256) \rceil$)). In the present application, landmarks are a type of keypoint. For example, a facial landmark is a type keypoint that describes a structure of a facial component.

In one configuration, landmark locations are associated with a Gaussian of two different magnitudes in the channels. Each landmark is assigned a unique ID from 0 to M−1. The network may learn the incremental assignment of IDs while training and use the incremental assignment to improve predictions.

The sign of the estimated value of a pixel at each output channel may determine the binary representation for that pixel. Additionally, the magnitude value may represent a confidence measure. Combining pixel-wise representations across all output channels generates a complete binary representation. For each targeted landmark, the overall confidence may be the mean of absolute values across channels. Each target landmark may be represented by a predefined binary sequence.

In one configuration, landmarks are selected based on pixel values with a highest confidence. The average confidence may represent visibility. Additionally or alternatively, a convolutional neural network may be trained on the estimated output heat maps to directly regress the landmark locations along with the visibility values.

Figure 4:
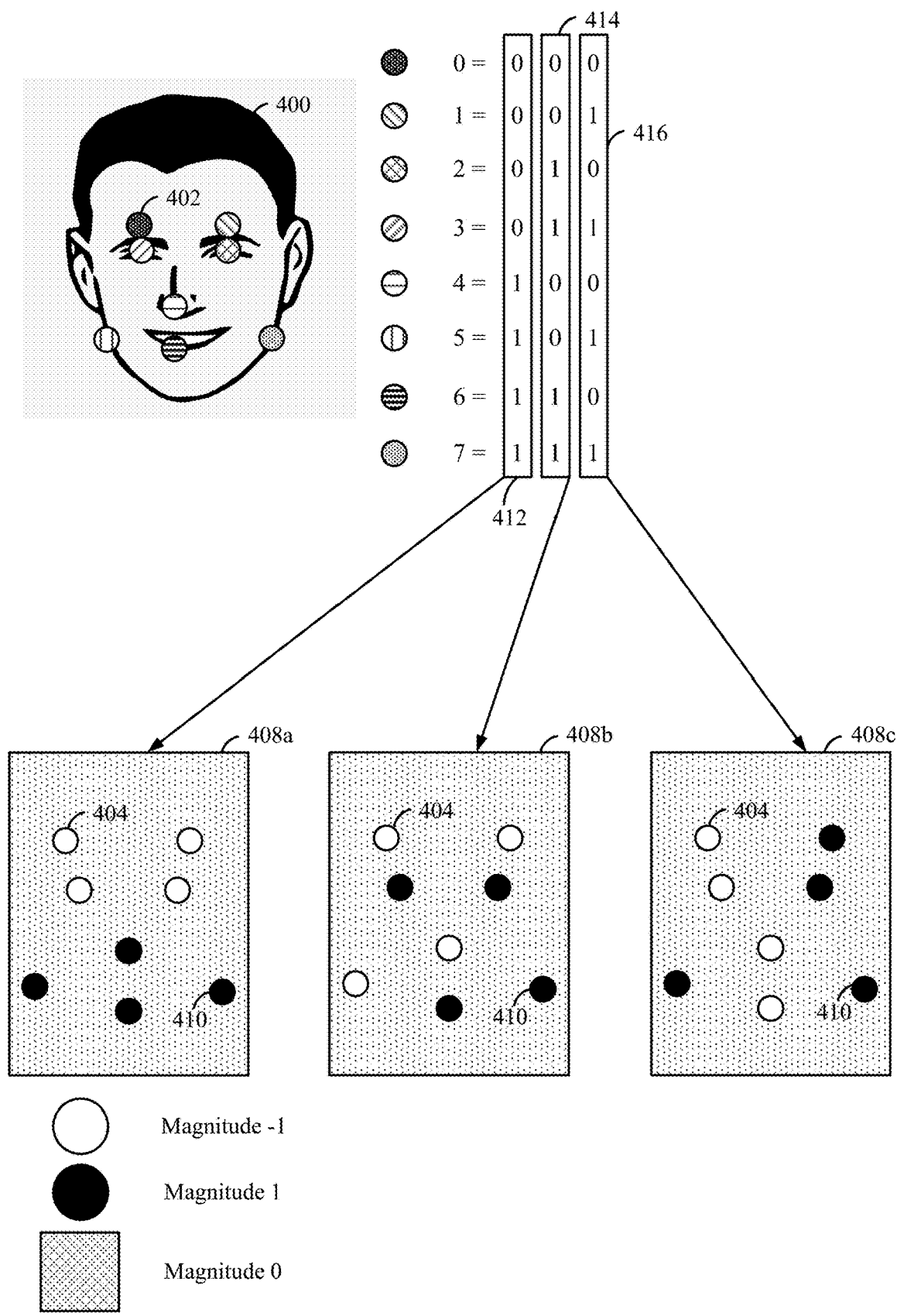
FIG. 4 illustrates an example of encoding landmarks in ground-truth heat maps in accordance with aspects of the present disclosure.

FIG. 4 illustrates an example of encoding landmarks 402 according to aspects of the present disclosure. Specifically, the example of FIG. 4 illustrates the encoding of landmarks 402 in ground-truth heat maps 408a, 408b, 408c. The neural network learns to identify landmarks in an input based on the ground-truth heat maps 408a, 408b, 408c. As shown in FIG. 4, an image 400 of a face may be annotated with eight landmarks 402. The number of landmarks 402 is not limited to eight, more or fewer landmarks may be used. Additionally, aspects of the present disclosure are not limited to detecting facial landmarks. Other landmarks, such as joint landmarks are contemplated.

In one configuration, $K = \lceil \log_2(M) \rceil$ Gaussian-masked channels denoted as $G^k$ (where, k=1, 2, . . . , K), for representing the landmark locations. For the example of FIG. 4, three channels 412, 414, 416 represent each landmark location (e.g., $3 = \lceil \log_2(8) \rceil$). In contrast, for the example of FIG. 4, a conventional system would use eight channels (e.g., one channel for each landmark).

As shown in FIG. 4, each landmark 402 corresponds to a unique ID (e.g., 0-K). A binary representation is generated for each ID (e.g., ID 1 is binarized to "001"). After binarization of the IDs, the binary value (e.g., 0 or 1) of each landmark 402 is encoded in each ground-truth heat map 408a, 408b, 408c by a unit variance Gaussian distribution with a magnitude of negative one or one at the spatial location corresponding to the landmark 402.

Each channel (k) 412, 414, 416 corresponds to a different binary value of an ID for a landmark 402. For example, a third channel 416 corresponds to a least significant bit of a binary representation of a landmark 402. In one configuration, a bit value of zero is represented in each ground-truth heat map 408a, 408b, 408c by a unit variance Gaussian distribution with a magnitude of negative one. Additionally, a bit value of one is represented in each ground-truth heat map 408a, 408b, 408c by unit variance Gaussian distributions with a magnitude of one. Accordingly, the unit variance Gaussian distribution for each bit of the binary representation of each landmark 402 is provided in a ground-truth heat map 408a, 408b, 408c of a channel 412, 414, 416.

As shown in FIG. 4, depending on the magnitude of the unit variance Gaussian distributions for each landmark 402, a spatial location at each ground-truth heat map 408a, 408b, 408c may be represented with a different pixel value (e.g., N(−1, 1) or N(1,1)). That is, a pixel value is either −1 or +1 for a landmark location and 0 for a background. For example, a first spatial location 404 corresponds to the landmark 402 of ID 0. As another example, a second spatial location 410 corresponds to the landmark 402 of ID 7. For brevity, only the first and second spatial locations 404, 410 are labeled in FIG. 4.

For example, the binary representation for the landmark 402 of ID 0 is "0 0 0." As such, each first spatial location 404 in the ground-truth heat maps 408a, 408b, 408c is represented by a unit variance Gaussian distribution with a magnitude of negative one. That is, because the binary value of each channel 412, 414, 416 is zero, the magnitude is negative one.

As another example, the binary representation for ID 7 is "1 1 1." As such, the second spatial location 410 is represented by a unit variance Gaussian distribution with a magnitude of one for the first and second heat map 408a, 408b. Additionally, the second spatial location 410 is represented by a unit variance Gaussian distribution with a magnitude of negative one in the third heat map 408c.

Pixels that are not associated with a landmark 402 may be represented with a Gaussian distribution of zero. For illustrative purposes, in FIG. 4, the white dots represent unit variance Gaussian distributions with a magnitude of negative one. The black dots represent unit variance Gaussian distributions with a magnitude of one.

The ground-truth heat maps train the neural network to retrieve landmarks from training data. For example, during a testing phase, the difference between landmark pixels and non-landmark pixels may not be clearly defined. That is, an output of a landmark detection network may be noisy. As such, the neural network may fail to accurately identify correct landmarks. In contrast, a difference between landmark pixels and non-landmark pixels in the ground-truth heat maps may be clearly defined. Based on the training, an accuracy of landmark identification may be improved.

In one configuration, the neural network is an hourglass neural network. The encoder and decoders in the hourglass network may be convolutional neural networks. For example, an encoder network may receive an image of a face. The encoder network may encode features of the input. A decoder network receives the encoded features to generate one or more heatmaps. The hourglass neural network may be a single hourglass network or a stacked set of hourglass networks.

In one configuration, landmarks are retrieved from heat map estimates. Specifically, nonzero pixels with a greatest confidence are selected as a landmark. This method may be referred to as max-confidence pick. In this method, for each output channel k, a value is estimated for each pixel $x_{i,j}^k$ of an image, where i and j are coordinates of the pixel. The neural network estimates a value of a pixel $x_{i,j}^k$ based on a prediction of whether the pixel represents a landmark or background. The values of the pixels $x_{i,j}^k$ generate a compact encoded heat-map. The neural network may be trained to estimate a value of a pixel $x_{i,j}^k$ from ground-truth heat maps (see FIG. 4). The value of the pixel $x_{i,j}^k$ in the output channel k is binarized to zero or one as $b(x_{i,j}^k)$:

$$b(x_{i,j}^k) = \begin{cases} 0, & x_{i,j}^k < 0 \\ 1, & x_{i,j}^k \geq 0 \end{cases} \quad (1)$$

In EQUATION 1, if the value of the pixel $x_{i,j}^k$ is less than zero, the pixel $x_{i,j}^k$ is binarized to zero (e.g., $b(x_{i,j}^k)=0$). If the value of the pixel $x_{i,j}^k$ is greater than or equal to zero, the pixel $x_{i,j}^k$ is binarized to one (e.g., $b(x_{i,j}^k)=1$). After binarizing the pixels $x_{i,j}^k$ in each channel k, the k channels are collapsed to obtain a K-bit binary representation for each pixel.

For example, a pixel may be binarized to zero for a first channel, binarized to one for a second channel, and binarized to one for a third channel. After collapsing the channels, the full three-bit binary representation of the pixel is zero, one, one. The K-bit binary representation denotes the landmark ID for a pixel. For example, if the full three-bit binary representation is zero, one, one, the landmark ID for the pixel is three (see FIG. 4).

In one configuration, background pixels are filtered from landmark pixels based on an absolute value. In this configuration, a confidence score $c_{i,j}$ is determined for a pixel $x_{i,j}$ across all the K channels. The confidence score $c_{i,j}$ is a sum of the absolute values of the pixel value $x_{i,j}^k$ at each channel k, i.e.

$$c_{i,j} = \sum_{k=0}^{K} |x_{i,j}^k|$$

If the confidence score is less than a threshold, the pixel may be considered a background pixel. If the confidence score is greater than a threshold, the pixel may be considered a landmark pixel. The background and landmark filtering may be performed before or after determining a K-bit binary representation for each pixel. For example, the K-bit binary representation may be determined for pixels that are filtered as landmark pixels.

If there are multiple instances with a same landmark ID, the instance with a maximum confidence is retained. Alternatively, if the confidence values of two or more landmark IDs are equivalent, a centroid location of the points is selected, and an average of the confidence values is assigned as the confidence for the centroid. Finally, if there is no instance of a landmark ID, the location is undefined, and the confidence is set as zero.

Figure 5:
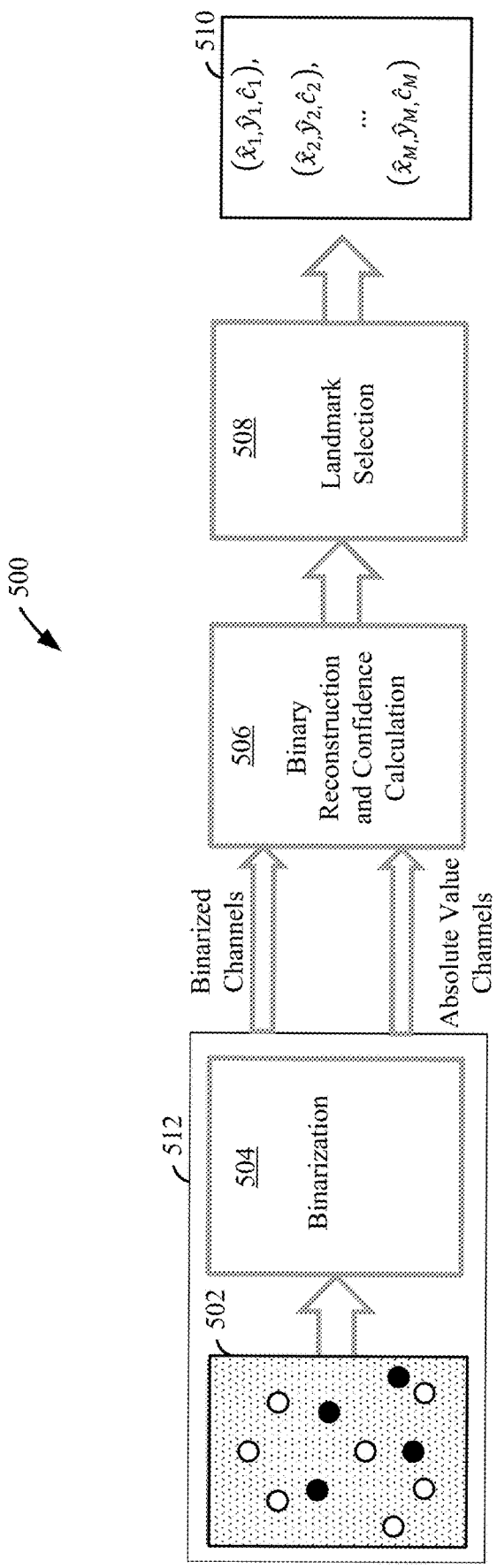
FIGS. 5-6 are block diagrams illustrating examples of processes for selecting landmarks in accordance with aspects of the present disclosure.

FIG. 5 illustrates an example 500 of retrieving landmark locations 510 by selecting landmarks with a greatest confidence according to aspects of the present disclosure. In the example of FIG. 5, a neural network generates the pixel values 502 for each pixel. The pixel values are estimated based on a prediction of whether a pixel represents a landmark or background. The pixel values may be generated from an image input to the neural network, such as an hourglass neural network.

In a process 512, the pixel values from the pixel values 502 may be binarized at a binarization block 504. The pixel values may be binarized according to EQUATION 1, where a pixel value that is less than zero is binarized to zero (e.g., $b(x_{i,j}^k)=0$). Additionally, a pixel value greater than or equal to zero is binarized to one (e.g., $b(x_{i,j}^k)=1$). As discussed, the number of channels is determined based on a number of landmarks (e.g., $K=\lceil \log_2(M) \rceil$, where M is the number of landmarks and K is the number of channels). The process 512 for generating the pixel values 502 and binarizing pixel values at the binarization block 504 may be repeated for each channel from the number of channel K.

After binarizing the pixel values for each channel, the absolute value of each pixel value of all channels K and the binarized channels are output to a binary reconstruction and confidence calculation block 506. In one configuration, the binary reconstruction and confidence calculation block 506 determines a confidence for each pixel. The confidence of a pixel is a sum of the absolute value of a pixel value for each channel.

For example, a pixel may have pixel values of "−0.3, 0.2, 0.1" for three channels. In this example, the confidence for the pixel is "0.6." (e.g., |−0.3|+|0.2|+|0.1|=0.6). A pixel with a confidence that is less than a threshold may be categorized as background. A pixel with a confidence that is greater than the threshold may be categorized as a landmark.

Additionally, the binary reconstruction and confidence calculation block 506 collapses the binary values of each pixel to a K-bit binary representation. The K-bit binary representation may be determined for all pixels or only pixels categorized as a landmark. The K-bit binary representation denotes the landmark ID for a pixel. The K-bit binary representations of the landmark pixels are output to a landmark selection block 508.

The landmark selection block 508 uses the landmark IDs and the confidence values to select the landmarks from the landmark IDs. As discussed, if there are multiple pixels with a same landmark ID, the pixel with a greatest confidence of the multiple pixels is retained as that landmark. Alternatively, if two or more pixels with same landmark IDs have equivalent confidence values, a centroid location of the pixels is selected and an average of the confidence values is assigned as the confidence for the centroid. The location of the centroid is selected as the landmark. Finally, if there is no instance of a landmark ID, the location is undefined, and the confidence is set as zero.

The landmark selection block 508 outputs the selected landmark locations 510, where $\hat{x}$ and $\hat{y}$ are coordinates and $\hat{c}$ is a confidence value. The blocks 504, 506, 508 may be implemented by a neural network that is the same as, or different from, the neural network used to generate the pixel values 502.

In another configuration, landmarks are retrieved by inputting the K estimated channels to a convolutional neural network that regresses the M landmark locations and corresponding confidence or visibility values. The network may learn the centroid and mean local representation of each point. Additionally, the network may interpolate a landmark position even if the location is not visible in an input.

Figure 6:
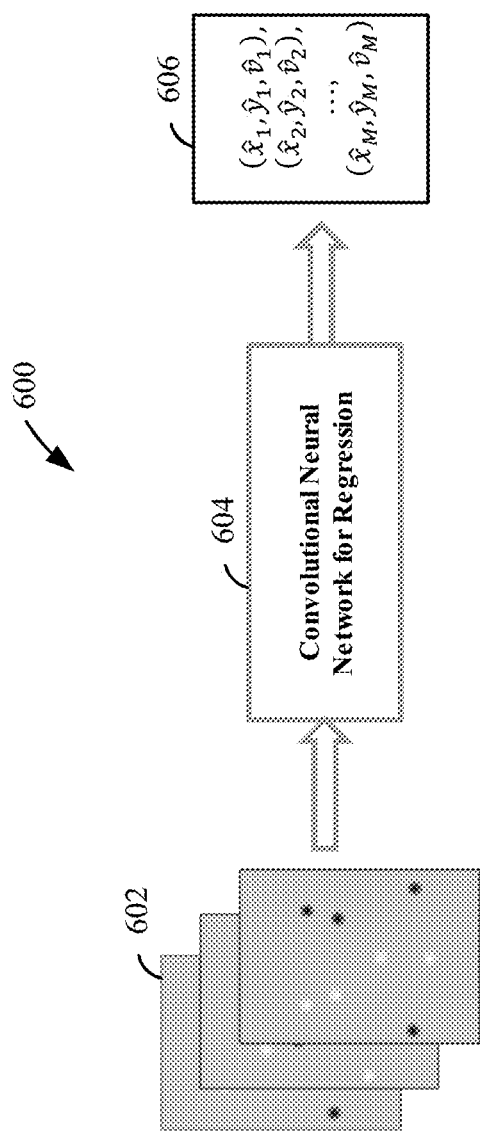

FIG. 6 illustrates an example 600 for retrieving landmark locations 606 according to aspects of the present disclosure. As shown in FIG. 6, K estimated channels 602 are input to a convolutional neural network 604. The K estimated channels 602 include estimated heatmaps for each channel, where the pixel values of the heatmap are generated from an image input to a neural network, such as an hourglass neural network, with the target to estimate the encoded heatmaps.

Based on a ground-truth representation, the convolutional neural network 604 regresses the M landmark locations 606 and corresponding confidence or visibility values. The network may learn the centroid and mean local representation of each point. Additionally, the network may interpolate a landmark position based on the positions of other nearby landmarks even if the landmark is not visible in an input due to occlusion.

Figure 7:
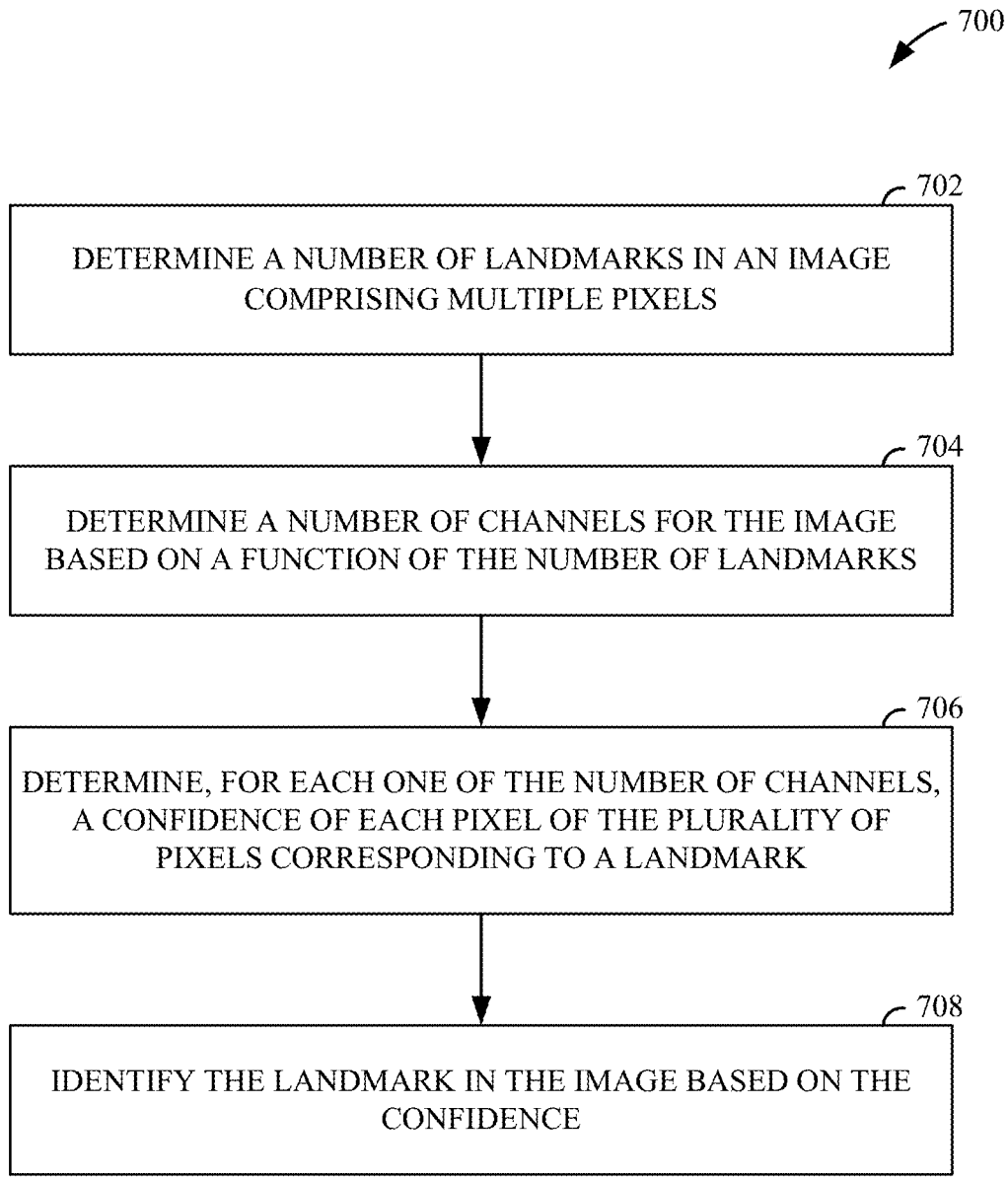
FIG. 7 illustrates a flow diagram for a method in accordance with aspects of the present disclosure.

FIG. 7 illustrates a flow diagram for a method 700 according to an aspect of the present disclosure. As shown in FIG. 7, at block 702, a neural network determines a number of landmarks in an image comprising multiple pixels. The landmarks may be a type of keypoint. For example, the landmarks may be facial landmarks and the image may be an image of a face. In one configuration, the neural network interpolates a location of a non-visible landmark.

Additionally, at block 704, the neural network determines a number of channels for the image based on a function of the number of landmarks. In one configuration, the neural network assigns, for each channel of the number of channels, a pixel value for each pixel of the multiple pixels. The neural network may also binarize each pixel value based on whether the pixel value is less than a first threshold. Additionally, the neural network may generate a landmark ID for each pixel of a set of pixels based on a binarized pixel value assigned to each channel.

At block 706, the neural network determines, for each one of the number of channels, a confidence of each pixel of the multiple pixels corresponding to a landmark. The confidence may be determined based on a sum of absolute values of pixel values for each channel. At block 708, the neural network identifies the landmark in the image based on the confidence. In one configuration, the neural network determines whether the pixel corresponds to the landmark based on the landmark ID and the confidence. Additionally, the neural network may The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method, comprising:
   determining a number of landmarks in an image comprising a plurality of pixels;
   determining a number of channels for the image based on a function of the number of landmarks, the number of channels being less than the number of landmarks;
   assigning, for each channel of the number of channels, a pixel value for each pixel of the plurality of pixels, the pixel value based on estimating whether the pixel corresponds to a landmark or a background;
   determining, for the number of channels, a confidence of each pixel of the plurality of pixels corresponding to the landmark, the confidence of each pixel being a sum of a respective absolute value of each pixel value associated with the pixel in each channel of the number of channels; and
   identifying the landmark in the image based on the confidence.

2. The method of claim 1, further comprising binarizing each pixel value based on whether the pixel value is less than a first threshold.

3. The method of claim 1, further comprising generating a landmark ID for each pixel of a set of pixels based on a binarized pixel value assigned to each channel.

4. The method of claim 3, further comprising determining whether the pixel corresponds to the landmark based on the landmark ID and the confidence.

5. The method of claim 1, further comprising interpolating a location of a non-visible landmark via a convolutional neural network.

6. An apparatus, comprising:
   a memory; and
   at least one processor operatively coupled to the memory, the memory and the at least one processor configured:
   to determine a number of landmarks in an image comprising a plurality of pixels;

to determine a number of channels for the image based on a function of the number of landmarks, the number of channels being less than the number of landmarks;

to assign, for each channel of the number of channels, a pixel value for each pixel of the plurality of pixels, the pixel value based on estimating whether the pixel corresponds to a landmark or a background;

to determine, for the number of channels, a confidence of each pixel of the plurality of pixels corresponding to the landmark, the confidence of each pixel being a sum of a respective absolute value of each pixel value associated with the pixel in each channel of the number of channels; and to identify the landmark in the image based on the confidence.

7. The apparatus of claim 6, in which the at least one processor is further configured to binarize each pixel value based on whether the pixel value is less than a first threshold.

8. The apparatus of claim 6, in which the at least one processor is further configured to generate a landmark ID for each pixel of a set of pixels from the plurality of pixels based on a binarized pixel value assigned to each channel.

9. The apparatus of claim 8, in which the at least one processor is further configured to determine whether the pixel corresponds to the landmark based on the landmark ID and the confidence.

10. The apparatus of claim 6, in which the at least one processor is further configured to interpolate a location of a non-visible landmark via a convolutional neural network.

11. An apparatus, comprising:

means for determining a number of landmarks in an image comprising a plurality of pixels;

means for determining a number of channels for the image based on a function of the number of landmarks, the number of channels being less than the number of landmarks;

means for assigning, for each channel of the number of channels, a pixel value for each pixel of the plurality of pixels, the pixel value based on estimating whether the pixel corresponds to a landmark or a background;

means for determining, for the number of channels, a confidence of each pixel of the plurality of pixels corresponding to the landmark, the confidence of each pixel being a sum of a respective absolute value of each pixel value associated with the pixel in each channel of the number of channels; and means for identifying the landmark in the image based on the confidence.

12. The apparatus of claim 11, further comprising means for binarizing each pixel value based on whether the pixel value is less than a first threshold.

13. The apparatus of claim 11, further comprising means for generating a landmark ID for each pixel of a set of pixels from the plurality of pixels based on a binarized pixel value assigned to each channel.

14. The apparatus of claim 13, further comprising means for determining whether the pixel corresponds to the landmark based on the landmark ID and the confidence.

* * * * *